US010571788B2

(12) United States Patent
Akiyama

(10) Patent No.: US 10,571,788 B2
(45) Date of Patent: Feb. 25, 2020

(54) LIGHT SOURCE DEVICE, ILLUMINATION DEVICE, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 21 days.

(21) Appl. No.: 16/034,839

(22) Filed: Jul. 13, 2018

(65) Prior Publication Data

US 2019/0033697 A1   Jan. 31, 2019

(30) Foreign Application Priority Data

Jul. 25, 2017   (JP) ................................ 2017-143488
Sep. 27, 2017   (JP) ................................ 2017-185673

(51) Int. Cl.
*G03B 33/12*      (2006.01)
*G03B 33/08*      (2006.01)
*G03B 21/20*      (2006.01)

(52) U.S. Cl.
CPC ..... *G03B 21/2033* (2013.01); *G03B 21/2013* (2013.01); *G03B 33/08* (2013.01); *G03B 33/12* (2013.01); *G03B 21/208* (2013.01)

(58) Field of Classification Search
CPC ............................ G03B 21/2033; G03B 33/12
USPC ........................................................ 353/81
See application file for complete search history.

(56) References Cited

U.S. PATENT DOCUMENTS

| 6,396,565 B1 | 5/2002 | Yamamoto et al. | |
|---|---|---|---|
| 8,998,421 B2 | 4/2015 | Akiyama et al. | |
| 2012/0212929 A1* | 8/2012 | Li | G03B 21/2033 362/19 |
| 2012/0320102 A1* | 12/2012 | Jorgensen | F21S 10/007 345/690 |
| 2014/0232992 A1* | 8/2014 | Egawa | G02B 27/48 353/30 |
| 2016/0040854 A1* | 2/2016 | Zhang | H01L 25/0753 362/242 |

(Continued)

FOREIGN PATENT DOCUMENTS

| EP | 1291711 A1 | 3/2003 | |
|---|---|---|---|
| JP | 2003209296 | * 7/2003 | ................ F21S 8/04 |
| JP | 2009-116163 A | 5/2009 | |

(Continued)

OTHER PUBLICATIONS

Translation of JP 2003209296 (Year: 2019).*
Nov. 28, 2018 Search Report issued in European Patent Application No. 18185554.5.

*Primary Examiner* — Jerry L Brooks
(74) *Attorney, Agent, or Firm* — Oliff PLC

(57) ABSTRACT

A light source device includes at least one first light emitting device configured to emit first light of a first color in a first direction and a plurality of second light emitting devices configured to emit second light of a second color different from the first color in the first direction. The number of the plurality of second light emitting devices is larger than the number of the at least one first light emitting device. The plurality of second light emitting devices are substantially rotationally symmetrically provided around the center axis of a first light in a peripheral region of the at least one first light emitting device.

17 Claims, 7 Drawing Sheets

(56) References Cited

U.S. PATENT DOCUMENTS

2016/0320665 A1* 11/2016 Cho ................ G02F 1/133504
2017/0199317 A1* 7/2017 Lee ................ G02F 1/133504

FOREIGN PATENT DOCUMENTS

| JP | 2010-78900 A | 4/2010 |
| JP | 2013-120250 A | 6/2013 |
| JP | 2013-231940 A | 11/2013 |
| JP | 2015-038958 A | 2/2015 |
| WO | 2011/006501 A1 | 1/2011 |

* cited by examiner

LIGHT SOURCE DEVICE, ILLUMINATION DEVICE, AND PROJECTOR

BACKGROUND

1. Technical Field

The present invention relates to a light source device, an illumination device, and a projector.

2. Related Art

In recent years, for improvement of the performance of projectors, a projector in which a laser light source, which is a light source having a wide color gamut and high efficiency, is used attracts attention.

As the projector of this type, JP-A-2009-116163 (Patent Literature 1) discloses a liquid crystal projector including a light source section including a red laser, a green laser, and a blue laser. JP-A-2010-78900 (Patent Literature 2) discloses a projector in which four laser light source devices for different colors are disposed in two rows and two columns such that the optical axes of the laser light source devices are parallel to one another. JP-A-2013-120250 (Patent Literature 3) discloses a projection-type video display device including an illumination optical system that irradiates blue laser light on a phosphor to thereby cause the phosphor to emit green fluorescent light and generates white illumination light including the green fluorescent light, blue light, and red light. In this patent literature, an illuminance distribution in an illuminated region is uniformized by a fly-eye lens and a condenser lens.

JP-A-2015-38958 (Patent Literature 4) discloses a light source device including a plurality of semiconductor laser devices and a rectangular holding member that houses the plurality of semiconductor laser devices. As the projector in which the laser light source is used, JP-A-2013-231940 (Patent Literature 5) discloses a light source device including separately disposed red, green, and blue lasers and two dichroic prisms that sequentially combine lights emitted from the color lasers and a projector including the light source device.

Light emission efficiency of the laser light source is different depending on a color. Therefore, to obtain white balance suitable for video display in the projector of Patent Literature 1, the number of necessary laser light sources is different for each of the colors.

To reduce the light source device in size in such a situation, as in Patent Literature 2, a configuration is conceivable in which a plurality of red laser light sources, a plurality of green laser light sources, and a plurality of blue laser light sources are collectively disposed in one part to configure one light source device and light emitted from the light source device is separated into a plurality of color lights by a color separation optical system described in Patent Literature 3.

In this case, all of the center axes of red lights emitted from the plurality of red laser light sources, the center axes of green lights emitted from the plurality of green laser light sources, and the center axes of blue lights emitted from the plurality of blue laser light sources deviate from the center axis of an entire illumination light beam emitted from the light source device. When the center axes do not coincide with each other, symmetry of diffused light is different for each of the colors with respect to the center axis of the entire illumination light beam when the illumination light beam diffuses on a diffusion plate. Therefore, when the fly-eye lens and the condenser lens are used to uniformize the illuminance distribution as in Patent Literature 3, color unevenness easily occurs in an image displayed on a screen. Further, the light source device increases in size.

When a light source device is configured using only a laser light source without using a wavelength conversion element such as a phosphor, for example, it is conceivable to use the light source device of Patent Literature 4 as a light source section for one color, separately prepare three sets of light source sections, that is, light source sections for red light, light source sections for green light, and light source sections for blue light, and combine the light source sections and a dichroic prism to configure the light source device disclosed in Patent Literature 5. However, in this configuration, the light source device increases in size.

SUMMARY

An advantage of some aspects of the invention is to provide a small light source device capable of emitting light including lights of different three colors, an illumination device including the light source device, and a projector including the illumination device.

An advantage of some aspects of the invention is to solve at least one of the problems.

A light source device according to an aspect of the invention includes: at least one first light emitting device configured to emit first light of a first color in a first direction; and a plurality of second light emitting devices configured to emit second light of a second color different from the first color in the first direction. A number of the plurality of second light emitting devices is larger than a number of the at least one first light emitting device. The plurality of second light emitting devices are substantially rotationally symmetrically provided around a center axis of a first light in a peripheral region of the at least one first light emitting device.

The light source device is compact. The center axis of the second light of the second color coincides with the center axis of the first light of the first color. Note that, in this specification, the center axis of the spread (the distribution) of a bundle of rays is referred to as center axis of light.

The light source device according to the aspect of the invention may further include a plurality of third light emitting devices configured to emit third light of a third color different from the first color and the second color in the first direction. A number of the plurality of third light emitting devices may be larger than the number of the at least one first light emitting device. The plurality of third light emitting devices may be substantially rotationally symmetrically provided around the center axis of the first light in the peripheral region of the at least one first light emitting device.

With the configuration described above, in addition to the center axis of the second light, the center axis of the third light of the third color coincides with the center axis of the first light.

In the light source device according to the aspect of the invention, angles that a plurality of straight lines connecting light emission centers of the first light emitting device, the second light emitting devices, and the third light emitting devices form one another may be equal to one another.

With this configuration, it is possible to reduce an occupied area of a light source section including the first light emitting device, the second light source devices, and the third light source devices. Consequently, it is possible to implement a small light source device capable of emitting light including lights of different three colors without using a wavelength conversion element such as a phosphor.

In the light source device according to the aspect of the invention, light emission efficiency of the at least one first light emitting device may be higher than light emission efficiency of each of the plurality of second light emitting devices and light emission efficiency of each of the plurality of third light emitting devices.

With this configuration, the light emission efficiency of the first light emitting device smaller in number is higher than the light emission efficacy of the second light emitting devices and the third light emitting devices larger in number. Therefore, it is easy to keep color balance.

In the light source device according to the aspect of the invention, the first color may be blue, the second color may be green, and the third color may be red.

With this configuration, it is easy to keep white balance.

The light source device according to the aspect of the invention may include a singularity of the first light emitting device, a trio of the second light emitting devices, and a trio of the third light emitting devices.

With this configuration, it is possible to implement a small light source device capable of emitting white light.

In the light source device according to the aspect of the invention, the first light emitting device may include a first light emitting element and a first housing configured to house the first light emitting element on an inside, the second light emitting devices may include second light emitting elements and second housings configured to house the second light emitting elements on insides, the third light emitting devices may include third light emitting elements and third housings configured to house the third light emitting elements on insides, and the first housing, the second housings, and the third housings may be in contact with one another.

With this configuration, it is possible to most densely dispose the first light emitting devices, the second light emitting devices, and the third light emitting devices. It is possible to implement a smaller light source device.

An illumination device according to another aspect of the invention includes: the light source device according to the aspect of the invention; a condensing optical system configured to condense light emitted from the light source device in a predetermined condensing position; and a diffusion device including a diffusion element irradiated with the light condensed by the condensing optical system and configured to diffuse the light; and a rotating section configured to rotate the diffusion element.

With the illumination device according to the aspect of the invention, the light diffused by the diffusion device and having a temporally changing diffusion angle distribution is emitted from the illumination device. Consequently, it is possible to provide an illumination device with fewer speckles and less illuminance unevenness.

An illumination device according to still another aspect of the invention includes: the light source device according to the aspect of the invention; a light separation element configured to separate the first light, the second light, and the third light into the first light and fourth light including the second light and the third light; a first diffusion element provided on an optical path of the first light in a post stage of the light separation element and configured to diffuse the first light; and a second diffusion element provided on an optical path of the fourth light in the post stage of the light separation element and configured to diffuse the fourth light. Diffusion power of the first diffusion element is larger than diffusion power of the second diffusion element.

A projector including the illumination device according to the aspect of the invention can project a color image with reduced color unevenness. Therefore, the illumination device is suitable for the projector.

In the illumination device according to the aspect of the invention, each of the first light, the second light, and the third light may be linearly polarized light, a polarization direction of the second light and a polarization direction of the third light may be respectively orthogonal to a polarization direction of the first light, and the light separation element may be configured by a polarization separation element.

With this configuration, it is easy to configure the illumination device using a semiconductor laser element that emits linearly polarized light with high power.

The illumination device according to the aspect of the invention may further include: a first phase difference plate provided on the optical path of the first light between the light separation element and the first diffusion element; and a second phase difference plate provided on the optical path of the fourth light between the light separation element and the second diffusion element, the first diffusion element and the second diffusion element may have light reflectance, the first diffusion element may be provided to reflect the first light transmitted through the first phase difference plate toward the first phase difference plate, the second diffusion element may be provided to reflect the fourth light transmitted through the second phase difference plate toward the second phase difference plate, and the polarization separation element may have a function of combining the first light reflected on the first diffusion element and transmitted through the first phase difference plate and the fourth light reflected on the second diffusion element and transmitted through the second phase difference plate and generating combined light.

With this configuration, an optical loss due to diffusion is small compared with when the first diffusion element and the second diffusion element are a transmission type. Because the combined light obtained by combining the diffused and reflected first and second lights is emitted, illumination light with less color unevenness is emitted.

A projector according to still another aspect of the invention includes: the illumination device according to the aspect of the invention; a light modulation device configured to modulate, according to image information, light emitted from the illumination device to thereby form image light; and a projection optical device configured to project the image light.

The projector according to the aspect of the invention includes the illumination device according to the aspect of the invention. Therefore, the projector can project an image with less color unevenness. With this configuration, it is possible to implement a small projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
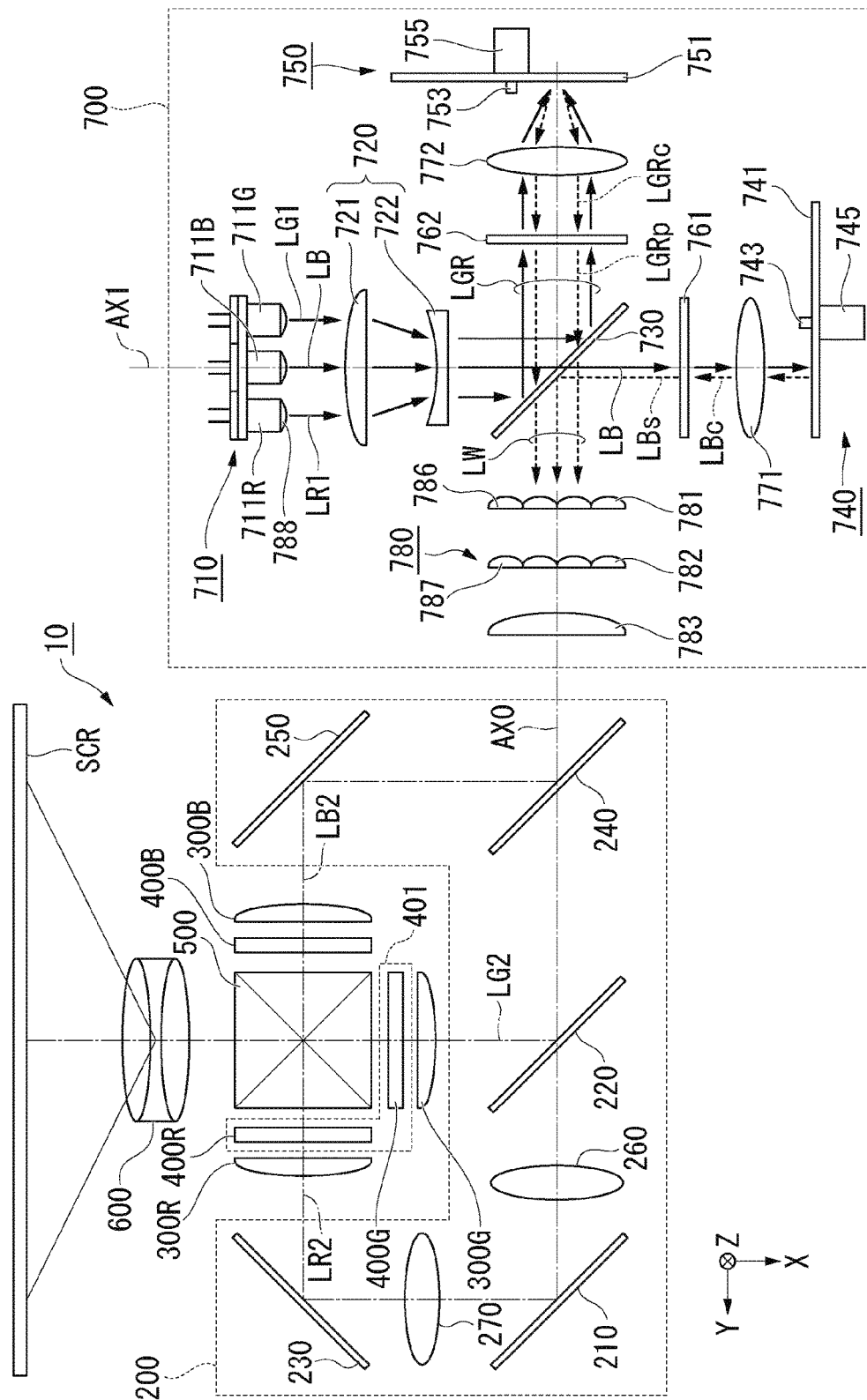
FIG. 1 is a schematic configuration diagram of a projector according to a first embodiment of the invention.

A first embodiment of the invention is explained below with reference to FIGS. 1 to 5.

A projector according to this embodiment is an example of a liquid crystal projector including a light source device in which a semiconductor laser is used.

Note that, in the drawings referred to below, to make it easy to see components, scales of dimensions are sometimes differentiated and shown depending on the components.

A projector 10 according to this embodiment is a projection-type image display apparatus that projects a color image on a screen (a projection surface) SCR. In the projector 10, three light modulating devices respectively corresponding to red light LR, green light LG, and blue light LB are used. In the projector 10, a semiconductor laser that can obtain high-luminance and high-power light is used as a light emitting element of the light source device.

FIG. 1 is a schematic configuration diagram of the projector 10 according to this embodiment.

As shown in FIG. 1, the projector 10 includes an illumination device 700, a color separation light guide optical system 200, a light modulating device for red light 400R, a light modulating device for green light 400G, a light modulating device for blue light 400B, a combination optical system 500, and a projection optical device 600. The light modulating device for red light 400R, the light modulating device for green light 400G, and the light modulating device for blue light 400B modulate, according to image information, light emitted from the illumination device 700 to thereby form image light. The projection optical device 600 projects the image light.

In the illumination device 700, a light source device 710, a beam width reduction optical system 720, a polarization separation element 730 (a light separating element), a first phase difference plate 761, a first condensing lens 771, and a first diffusion device 740 are provided on an optical axis AX1 of light emitted from the light source device 710. A second diffusion device 750, a second condensing lens 772, a second phase difference plate 762, the polarization separation element 730, and an integrator optical system 780 are provided on an optical axis AX0 of illumination light emitted from the illumination device 700.

In the following explanation, a direction in which illumination light is emitted from the illumination device 700 is represented as a Y direction, a direction in which light is emitted from the light source device 710 is represented as an X direction, and a direction perpendicular to the X direction and the Y direction is represented as a Z direction. The optical axis AX1 is parallel to an X axis. The optical axis AX0 is parallel to a Y axis.

Figure 2:
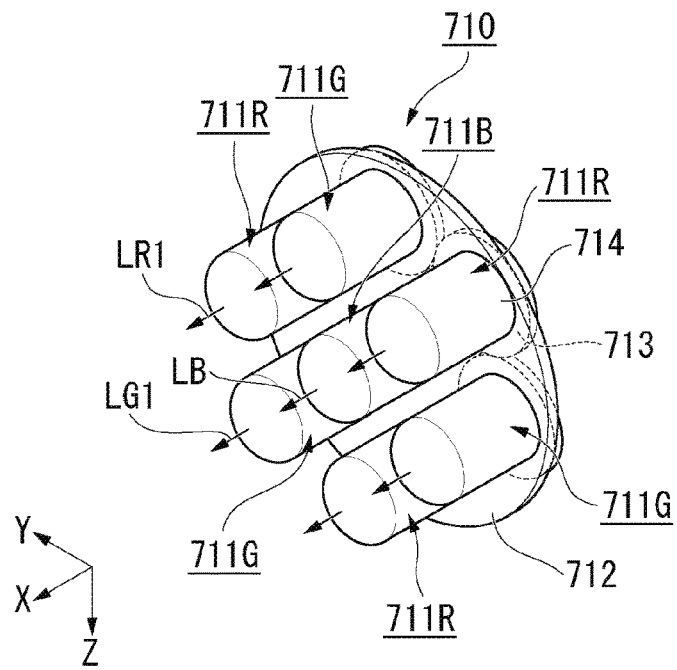
FIG. 2 is a perspective view of a light source device according to the first embodiment.
Figure 3:
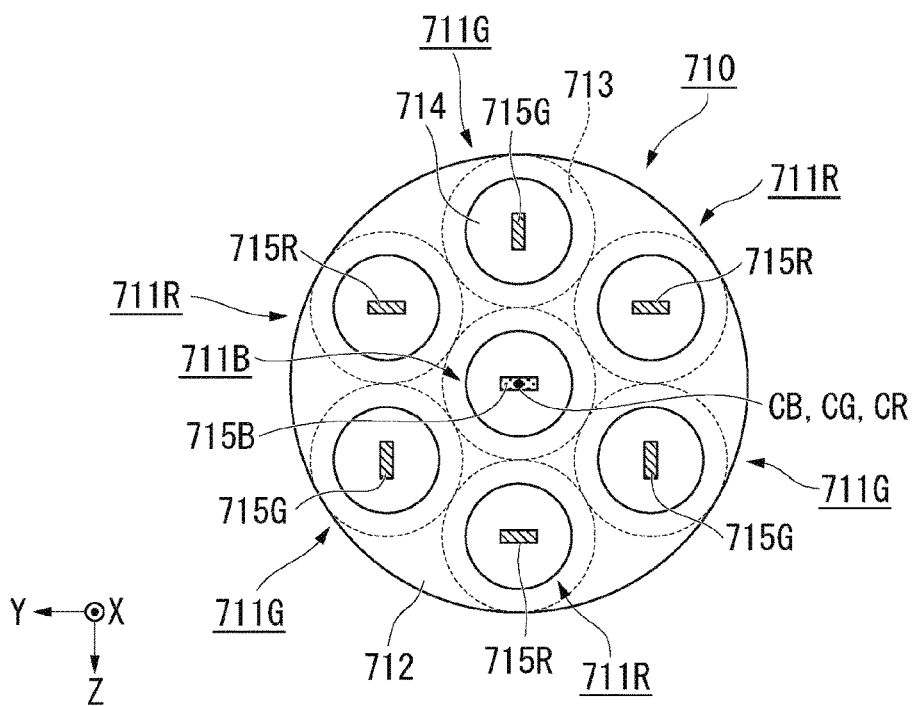
FIG. 3 is a front view of the light source device according to the first embodiment.

FIG. 2 is a perspective view of the light source device 710. In FIG. 2, to make it easy to see the drawing, illustration of pedestals of a part of semiconductor lasers is omitted. FIG. 3 is a front view of the light source device 710 viewed from the X-axis direction.

As shown in FIGS. 2 and 3, the light source device 710 includes at least one blue semiconductor laser 711B (a first light emitting device), a plurality of green semiconductor lasers 711G (second light emitting devices), a plurality of red semiconductor lasers 711R (third light emitting devices), and a holding member 712.

In this embodiment, the light source device 710 includes one blue semiconductor laser 711B, three green semiconductor lasers 711G, and three red semiconductor lasers 711R. Note that the light source device 710 may include a plurality of blue semiconductor lasers 711B.

The blue semiconductor laser 711B emits blue light LB (first light of a first color) in a first direction. The green semiconductor lasers 711G emit green beams LG1 in the first direction. The red semiconductor lasers 711R emit red beams LR1 in the first direction. Consequently, light including the color lights LB, LG1, and LR1 of these three colors is emitted from the entire light source device 710.

In the following explanation, a plurality of green beams LG1 emitted from the plurality of green semiconductor lasers 711G are collectively referred to as green light LG (second light of a second color). A plurality of red beams LR1 emitted from the plurality of red semiconductor lasers 711R are collectively referred to as red light LR (third light of a third color).

Each of the blue semiconductor laser 711B, the green semiconductor lasers 711G, and the red semiconductor lasers 711R is configured by a semiconductor laser of a CAN package type. In each of packages including pedestals 713 and can bodies 714, one or more semiconductor laser chips 715B, one or more semiconductor laser chips 715G, or one or more semiconductor laser chips 715R are housed. As shown in FIG. 1, a collimate lens 788 is attached to a light emission side of the package.

Because light emission efficiency of a semiconductor laser is different for each of the light emission colors, an optical output of the semiconductor laser is also different for each of the light emission colors. Light emission efficiency of the blue semiconductor laser 711B is higher than light emission efficiency of the green semiconductor lasers 711G and light emission efficiency of the red semiconductor lasers 711R. Therefore, an optical output of the blue semiconductor laser 711B is higher than an optical output of the green semiconductor lasers 711G and an optical output of the red semiconductor lasers 711R.

As an example, according to Nichia Corporation, home page, product information, "Laser Diode (LD)", [online], [retrieved on Jun. 14, 2017], Internet <URL://www.nichia-.co.jp/jp/product/laser.html>, an optical output of a blue semiconductor laser (model number: NDB7K75) is, for example, 3.5 W (working temperature: 25° C.) and an optical output of a green semiconductor laser (model number: NDG7K75T) is, for example, 1 W (working temperature: 25° C.) According to Mitsubishi Electric Corporation, home page, news release, "Notice of release of a 639 nm red high-power semiconductor laser for a projector" [online], [retrieved on Jun. 14, 2017], Internet <URL:http://www.mitsubishielectric.co.jp/news/2016/1214.html>, an optical output of a red semiconductor laser is, for example, 2.1 W (25° C.)

When the optical output at the temperature of 25° C. is converted into an optical output at an actual working temperature of 45° C., the optical output of the blue semiconductor laser is 2.8 W, the optical output of the green semiconductor laser is 0.8 W, and the optical output of the red semiconductor laser is 1.26 W. On the other hand, optical outputs of the blue semiconductor laser, the green semiconductor laser, and the red semiconductor laser necessary to obtain white light having brightness of 1000 lm are respectively 1.23 W, 2.03 W, and 2.92 W.

From the above, the numbers of the blue semiconductor laser 711B, the green semiconductor lasers 711G, and the red semiconductor lasers 711R necessary to obtain white light having brightness of 1000 lm are respectively one, three, and three. That is, the numbers of the plurality of green semiconductor lasers 711G and the plurality of red semiconductor lasers 711R are larger than the number of the at least one blue semiconductor laser 711B.

Note that, when one semiconductor laser includes a plurality of semiconductor laser chips, light emission efficiency of the semiconductor laser is equal to total light emission efficiency of the plurality of semiconductor laser chips.

According to the surmise of the inventor, in future, there is possibility that, according to the progress of the semiconductor laser technology, the optical outputs of the semiconductor lasers 711B, 711G, and 711R become larger than the numerical values described above. However, a ratio of the numbers of the semiconductor lasers 711B, 711G, and 711R necessary to obtain white light does not change. Therefore, although the light source device 710 according to this embodiment includes the one blue semiconductor laser 711B, three green semiconductor lasers 711G, and three red semiconductor lasers 711R, the numbers of the semiconductor lasers are not limited to this example.

The holding member 712 is configured by a circular plate material in which holes as many as the number the plurality of semiconductor lasers 711B, 711G, and 711R are provided. The material of the plate material is not particularly limited. However, for example, metal having high thermal conductivity is desirable. The can bodies 714 are inserted through the holes of the holding member 712, whereby each of the plurality of semiconductor lasers 711B, 711G, and 711R is supported by the holding member 712.

As shown in FIG. 3, the plurality of green semiconductor lasers 711G and the plurality of red semiconductor lasers 711R are provided in a peripheral region of the blue semiconductor laser 711B to surround the blue semiconductor laser 711B. Further, the green semiconductor lasers 711G and the red semiconductor lasers 711R are alternately provided along the circumferential direction of the holding member 712. One green semiconductor laser 711G is provided in contact with the red semiconductor lasers 711R on both sides. One red semiconductor laser 711R is provided in contact with the green semiconductor lasers 711G on both sides.

In this way, the plurality of green semiconductor lasers 711G are provided substantially rotationally symmetrically around a center axis CB of the blue light LB in the peripheral region of the blue semiconductor laser 711B. The plurality of red semiconductor lasers 711R are provided substantially rotationally symmetrically around the center axis CB of the blue light LB in the peripheral region of the blue semiconductor laser 711B. Therefore, a center axis CG of the green light LG and a center axis CR of the red light LR coincide with the center axis CB of the blue light LB. Consequently, color unevenness of an image displayed on the screen SCR is reduced. Note that, in this specification, the description "substantially rotationally symmetrically" includes not only complete rotationally symmetrical disposition but also disposition that can reduce color unevenness to an allowable degree. The light source device 710 is compact.

As shown in FIG. 3, the semiconductor lasers 711B 711G, and 711R are provided such that the long side of a light emission region of the semiconductor laser chip 715B is parallel to the Y axis, the long side of a light emission region of the semiconductor laser chip 715G is parallel to a Z axis, and the long side of a light emission region of the semiconductor laser chip 715R is parallel to the Y axis. Therefore, the blue semiconductor laser 711B emits the blue light LB, which is P polarized light with respect to the polarization separation element 730. The green semiconductor lasers 711G and the red semiconductor lasers 711R respectively emit the green beams LG1 and the red beams LR1, which are S polarized lights with respect to the polarization separation element 730. In the following explanation, light including the green beams LG1 and the red beams LR1 is referred to as light LGR (fourth light). The light LGR is S polarized light. Polarization directions of the P polarized light and the S polarized light are orthogonal to each other.

As shown in FIG. 1, the beam width reduction optical system 720 is configured by an afocal optical system including a convex lens 721 and a concave lens 722. The beam width reduction optical system 720 reduces the diameter of light emitted from the light source device 710.

The polarization separation element 730 is disposed to form an angle of 45° with respect to each of the optical axis AX0 and the optical axis AX1. The polarization separation element 730 separates light emitted from the light source device 710 into S polarized light and P polarized light with respect to the polarization separation element 730. Specifically, the polarization separation element 730 transmits the blue light LB, which is the P polarized light, and reflects the light LGR, which is the S polarized light.

The first phase difference plate 761 is provided on an optical path of the blue light LB between the polarization separation element 730 and the first diffusion device 740. The first phase difference plate 761 is configured by a ¼ wavelength plate with respect to a wavelength region of the blue light LB. The first phase difference plate 761 converts a polarization state of the blue light LB transmitted through the first phase difference plate 761 from the P polarized light into, for example, clockwise circularly polarized light.

The first condensing lens 771 is provided on an optical path of the blue light LB between the first phase difference plate 761 and the first diffusion device 740. The first condensing lens 771 condenses the blue light LB emitted from the first phase difference plate 761 on a first diffusion plate 741 of the first diffusion device 740 and receives diffused light emitted from the first diffusion plate 741 and guides the diffused light to the first phase difference plate 761.

The first diffusion device 740 includes the first diffusion plate 741 (a first diffusion element) and a motor 745 for rotating the first diffusion plate 741. The first diffusion plate 741 has, for example, a configuration in which unevenness is formed on the surface of a member having light reflectance and has diffusion reflectance. Diffusion power of the first diffusion plate 741 is larger than diffusion power of a second diffusion plate 751 explained below. The first diffusion plate 741 is formed in, for example, a circular shape when viewed from the direction of a rotation axis 743. The first diffusion plate 741 diffuses and reflects the incident blue light LB toward the first condensing lens 771. The blue light LB made incident as the clockwise circularly polarized light is diffused and reflected on the first diffusion plate 741 to change to blue diffused light LBc serving as counterclockwise circularly polarized light.

The blue diffused light LBc serving as the counterclockwise circularly polarized light diffused and reflected by the first diffusion plate 741 and transmitted through the first condensing lens 771 again is transmitted through the first phase difference plate 761 again to be changed to blue light LBs serving as S polarized light. The blue light LBs of the S polarized light is reflected on the polarization separation element 730 and travels to the integrator optical system 780.

On the other hand, the second phase difference plate 762 is provided on an optical path of the light LGR between the polarization separation element 730 and the second diffusion device 750. The second phase difference plate 762 is configured by a wideband ¼ wavelength plate corresponding to a wavelength region of the green beams LG1 to the red beams LR1. The second phase difference plate 762 converts a polarization state of the light LGR transmitted through the second phase difference plate 762 from the S polarized light into, for example, counterclockwise circularly polarized light.

The second condensing lens 772 is provided on an optical path of the light LGR between the second phase difference plate 762 and the second diffusion device 750. The second condensing lens 772 condenses the light LGR emitted from the second phase difference plate 762 on a second diffusion plate 751 of the second diffusion device 750 and receives diffused light emitted from the second diffusion plate 751 and guides the diffused light to the second phase difference plate 762.

The second diffusion device 750 includes the second diffusion plate 751 (a second diffusion element) and a motor 755 for rotating the second diffusion plate 751. The second diffusion plate 751 has, for example, a configuration in which unevenness is formed on the surface of a member having light reflectance and has diffusion reflectance. The second diffusion plate 751 is formed in, for example, a circular shape when viewed from the direction of a rotation axis 753. The second diffusion plate 751 diffuses and reflects the incident light LGR toward the second condensing lens 772. The light LGR serving as the counterclockwise circularly polarized light is diffused and reflected on the second diffusion plate 751 to change to diffused light LGRc serving as clockwise circularly polarized light.

The diffused light LGRc serving as the clockwise circularly polarized light diffused and reflected by the second diffusion plate 751 and transmitted through the second condensing lens 772 again is transmitted through the second phase difference plate 762 again to change to light LGRp serving as P polarized light. The light LGRp is transmitted through the polarization separation element 730 and travels to the integrator optical system 780. That is, the polarization separation element 730 combines the blue light LBs emitted from the first diffusion device 740 and the light LGRp emitted from the second diffusion device 750 to generate white combined light (illumination light LW).

The integrator optical system 780 includes a first lens array 781, a second lens array 782, and a superimposing lens 783. The integrator optical system 780 uniformizes an illuminance distribution of the illumination light LW emitted from the polarization separation element 730 in an image forming region of each of the light modulating device for red light 400R, the light modulating device for green light 400G, and the light modulating device for blue light 400B.

The first lens array 781 includes a plurality of lenses 786 for dividing the illumination light LW emitted from the polarization separation element 730 into a plurality of partial bundles of rays. The plurality of lenses 786 are arrayed in a matrix shape in a plane orthogonal to the optical axis AX0.

The second lens array 782 includes a plurality of lenses 787 corresponding to the plurality of lenses 786. The second lens array 782 forms, in conjunction with the superimposing lens 783 in a post stage, images of the lenses 786 in the image forming region of each of the light modulating device for red light 400R, the light modulating device for green light 400G, and the light modulating device for blue light 400B or the vicinity of the image forming region. The plurality of lenses 787 are arrayed in a matrix shape in the plane orthogonal to the optical axis AX0.

The superimposing lens 783 condenses partial bundles of rays emitted from the second lens array 782 and superimposes the partial bundles of rays one on top of another in the image forming region of each of the light modulating device for red light 400R, the light modulating device for green light 400G, and the light modulating device for blue light 400B or the vicinity of the image forming region.

The color separation light guide optical system 200 includes a dichroic mirror 240, a dichroic mirror 220, a reflection mirror 210, a reflection mirror 230, a reflection mirror 250, a relay lens 260, and a relay lens 270. The color separation light guide optical system 200 separates the illumination light LW emitted from the illumination device 700 into red light LR2, green light LG2, and blue light LB2 and guides the red light LR2, the green light LG2, and the blue light LB2 respectively to the light modulating device for red light 400R, the light modulating device for green light 400G, and the light modulating device for blue light 400B corresponding to the lights.

A field lens 300R, a field lens 300G, and a field lens 300B are respectively disposed between the color separation light guide optical system 200 and the light modulating device for red light 400R, the light modulating device for green light 400G, and the light modulating device for blue light 400B.

The dichroic mirror 240 reflects the blue light LB2 and transmits the red light LR2 and the green light LG2. The dichroic mirror 220 reflects the green light LG2 and transmits the blue light LB2. The reflection mirror 210 and the reflection mirror 230 reflect the red light LR2. The reflection mirror 250 reflects the blue light LB2.

Each of the light modulating device for red light 400R, the light modulating device for green light 400G, and the light modulating device for blue light 400B is configured from a liquid crystal panel that modulates incident color light according to image information and forms an image.

Note that, although not shown in FIG. 1, incident-side polarization plates are respectively disposed between the field lens 300R, the field lens 300G, and the field lens 300B and the light modulating device for red light 400R, the light modulating device for green light 400G, and the light modulating device for blue light 400B. Emission-side polarization plates are respectively disposed between the light modulating device for red light 400R, the light modulating device for green light 400G, and the light modulating device for blue light 400B and the combination optical system 500.

The combination optical system 500 combines image lights emitted from the light modulating device for red light 400R, the light modulating device for green light 400G, and the light modulating device for blue light 400B. The combination optical system 500 is configured from a cross dichroic prism formed in a substantially square shape in plan view obtained by pasting together four right-angle prisms. A dielectric multilayer film is provided on a substantially X-shaped interface obtained by pasting together the right-angle prisms.

Image light emitted from the combination optical system 500 is enlarged and projected on the screen SCR by the projection optical device 600.

In the light source device 710 in this embodiment, as explained above, the center axis CG of the green light LG coincides with the center axis CB of the blue light LB. Therefore, color unevenness due to green and blue is reduced in a projected image. The center axis CR of the red light LR coincides with the center axis CB of the blue light LB. Therefore, color unevenness due to red and blue is reduced in the projected image. The center axis CG of the green light LG coincides with the center axis CR of the red light LR. Therefore, color unevenness due to green and red is also reduced in the projected image.

The diffusion power of the first diffusion plate 741 included in the illumination device 700 according to this embodiment is larger than the diffusion power of the second diffusion plate 751 included in the illumination device 700. Therefore, color unevenness is further reduced. A reason for this is explained below.

Figure 4:
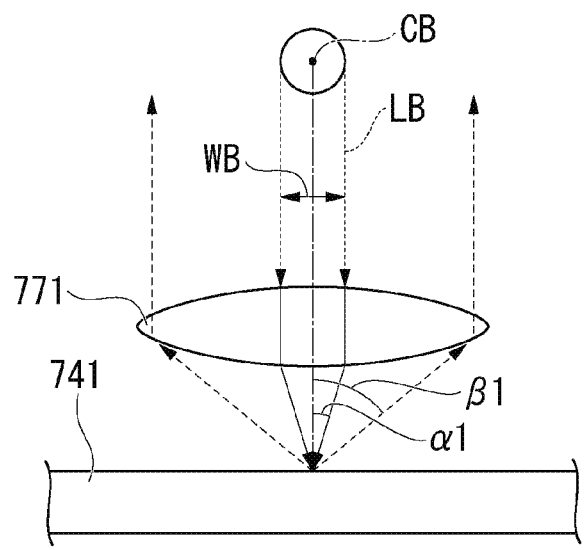
FIG. 4 is a schematic diagram for explaining the action of a first diffusion plate.

FIG. 4 is a schematic diagram for explaining the action of the first diffusion plate 741. Note that an upper part of FIG. 4 shows a sectional view of the blue light LB perpendicular to the center axis CB. A lower part of FIG. 4 shows a side view of the first condensing lens 771 and the first diffusion plate 741.

Figure 5:
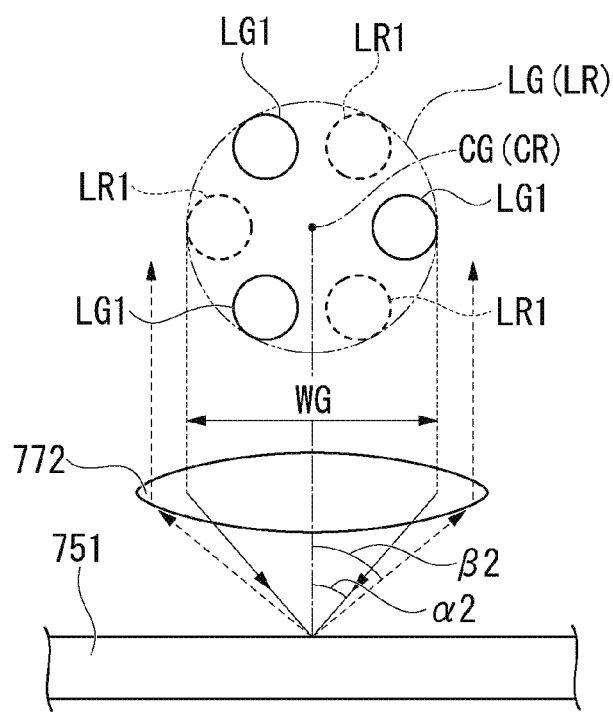
FIG. 5 is a schematic diagram for explaining the action of a second diffusion plate.

FIG. 5 is a schematic view for explaining the action of the second diffusion plate 751. Note that an upper part of FIG. 5 shows a sectional view of the green light LG and a sectional view of the red light LR perpendicular to the center axis CG (CR). A lower part of FIG. 5 shows a side view of the second condensing lens 772 and the second diffusion plate 751.

As shown in FIG. 4, the blue light LB is emitted from the one blue semiconductor laser 711B disposed in the center of the light source device 710.

On the other hand, the green light LG including three green beams LG1 is emitted from the three green semiconductor lasers 711G rotationally symmetrically provided around the center axis CB of the blue light LB as shown in FIG. 5. Similarly, the red light LR including three red beams LR1 is emitted from the three red semiconductor lasers 711R rotationally symmetrically provided around the center axis CB of the blue light LB.

A positional relation between the blue light LB and the plurality of green beams LG1 is the same as a positional relation between the blue light LB and the plurality of red beams LR1. Therefore, the blue light LB and the green light LG are explained as an example.

As shown in FIG. 4, the blue light LB is made incident to converge on the first diffusion plate 741. In this specification, a maximum value of an incident angle of the blue light LB made incident on the first diffusion plate 741 is referred to as convergent angle α1. Similarly, the green light LG is made incident to converge on the second diffusion plate 751. A maximum value of an incident angle of the green light LG made incident on the second diffusion plate 751 is referred to as convergent angle α2. The diameter of a smallest circle including the plurality of green beams LG1 is defined as a light beam width WG of the green light LG. A light beam width WB of the blue light LB shown in FIG. 4 is smaller than the light beam width WG of the green light LG shown in FIG. 5. Therefore, the convergent angle α1 of the blue light LB is smaller than the convergent angle α2 of the green light LG.

When it is assumed that the diffusion power of the first diffusion plate 741 and the diffusion power of the second diffusion plate 751 are the same, a size relation between divergent angles of the diffused and reflected blue and lights LB and LG is the same as a size relation between the convergent angle α1 and the convergent angle α2. Therefore, the divergent angle of the diffused and reflected blue light LB is smaller than the divergent angle of the diffused and reflected green light LG. When the blue light LB and the green light LG having different divergent angles each other are combined, even if the center axis CB coincides with the center axis CG, color unevenness occurs in an image displayed on the screen SCR.

On the other hand, in this embodiment, the diffusion power of the first diffusion plate 741 is larger than the diffusion power of the second diffusion plate 751. Therefore, the blue light LB made incident at the small convergent angle α1 is diffused large by the first diffusion plate 741 and the green light LG made incident at the large convergent angle α2 is diffused small by the second diffusion plate 751. As a result, as shown in FIGS. 4 and 5, it is possible to bring a divergent angle β1 of the diffused and reflected blue light LB close to a divergent angle β2 of the diffused and reflected green light LG. By adjusting the diffusion power of each of the first diffusion plate 741 and the second diffusion plate 751 as appropriate, it is possible to set the divergent angle β1 of the blue light LB substantially equal to the divergent angle β2 of the green light LG. Consequently, it is possible to further reduce color unevenness concerning blue and green. The same applies to the red light LR. Therefore, the white illumination light LW with less color unevenness is emitted from the illumination device 700.

The number of each of the green semiconductor lasers 711G and the red semiconductor lasers 711R having relatively low light emission efficiency is larger than the number of the blue semiconductor lasers 711B having relatively high light emission efficiency. Therefore, it is easy to keep color balance of light emitted from the light source device 710 compared with when the numbers of the color semiconductor lasers for the respective colors are equal to each other.

Each of seven semiconductor lasers including the one blue semiconductor laser 711B, the three green semiconductor lasers 711G, and the three red semiconductor lasers 711R is disposed to be adjacent to a semiconductor laser adjacent to each other. Therefore, it is possible to achieve a reduction in the size of the light source device.

In the illumination device 700 according to this embodiment, a configuration is adopted in which the blue light LB is the P polarized light and the green beams LG1 and the red beams LR1 are respectively the S polarized lights. By setting rotation angles around the optical axes AX1 of the CAN packages of the semiconductor lasers according to a polarization state desired to be obtained, it is possible to easily implement the configuration explained above.

The diffusion element of the transmission type has a large optical loss because of backward scattering. However, because the first diffusion plate 741 and the second diffusion plate 751 are a reflection type, an optical loss is small. Further, it is possible to reduce the illumination device 700 in size.

The projector 10 according to this embodiment includes the illumination device 700 explained above. Therefore, the projector 10 can project an image with less color unevenness.

Modification of the First Embodiment

A modification of the first embodiment is explained below with reference to FIG. 6.

A basic configuration of an illumination device according to the modification is the same as the basic configuration in the first embodiment. The configuration of a part of the illumination device is different from the configuration in the first embodiment. Therefore, explanation of the entire illumination device is omitted. Only differences from the first embodiment are explained.

Figure 6:
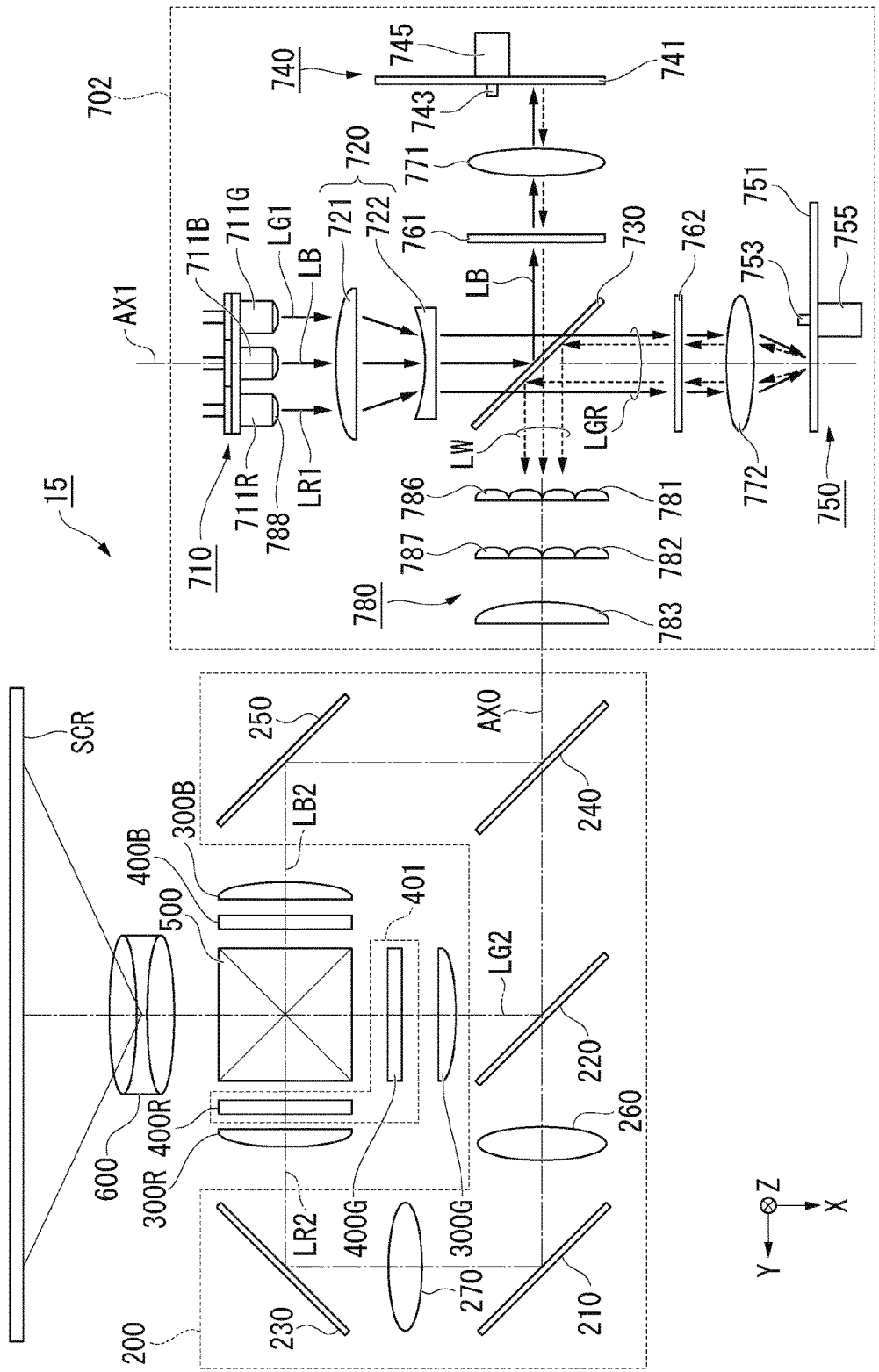
FIG. 6 is a schematic configuration diagram of a projector according to a modification of the first embodiment.

FIG. 6 is a schematic configuration diagram of a projector 15 according to the modification.

In FIG. 6, components common to FIG. 1 referred to in the first embodiment are denoted by the same reference numerals and signs and explanation of the components is omitted.

As shown in FIG. 6, in an illumination device 702 according to this modification, the light source device 710, the beam width reduction optical system 720, the polarization separation element 730, the second phase difference plate 762, the second condensing lens 772, and the second diffusion device 750 are provided on the optical axis AX1. The first diffusion device 740, the first condensing lens 771, the first phase difference plate 761, the polarization separation element 730, and the integrator optical system 780 are provided on the optical axis AX0 orthogonal to the optical axis AX1. That is, in the illumination device 702 according to this modification, the positions of the first diffusion device 740, the first condensing lens 771, and the first phase difference plate 761 and the positions of the second diffusion device 750, the second condensing lens 772, and the second phase difference plate 762 are reversed from the positions in the illumination device 700 according to the first embodiment.

In this modification, the blue semiconductor laser 711B emits the blue light LB of the S polarized light with respect to the polarization separation element 730. The green semiconductor laser 711G and the red semiconductor laser 711R respectively emit the green light LG and the red light LR of the P polarized light with respect to the polarization separation element 730. Therefore, the blue light LB is reflected on the polarization separation element 730 and guided to the first diffusion device 740. The green beams LG1 and the red beams LR1 are transmitted through the polarization separation element 730 and guided to the second diffusion device 750.

To implement the configuration explained above, the rotation angles around the optical axes AX1 of the CAN packages of the semiconductor lasers 711B, 711G, and 711R shown in FIG. 3 only have to be shifted 90°. That is, the semiconductor lasers 711B, 711G, and 711R only have to be disposed such that the long side of the light emission region of the semiconductor laser chip 715B is parallel to the Z axis, the long side of the light emission region of the semiconductor laser chip 715G is parallel to the Y axis, and the long side of the light emission region of the semiconductor laser chip 715R is parallel to the Z axis.

In this modification, the same effect as the effect in the first embodiment is obtained, that is, an image in which color unevenness less easily occurs is projected.

Second Embodiment

A second embodiment of the invention is explained below with reference to FIG. 7.

The configuration of a projector according to the second embodiment is substantially the same as the configuration in the first embodiment. The configuration of an illumination device is different from the configuration in the first embodiment. Therefore, explanation of the entire projector is omitted. Only differences from the first embodiment are explained.

Figure 7:
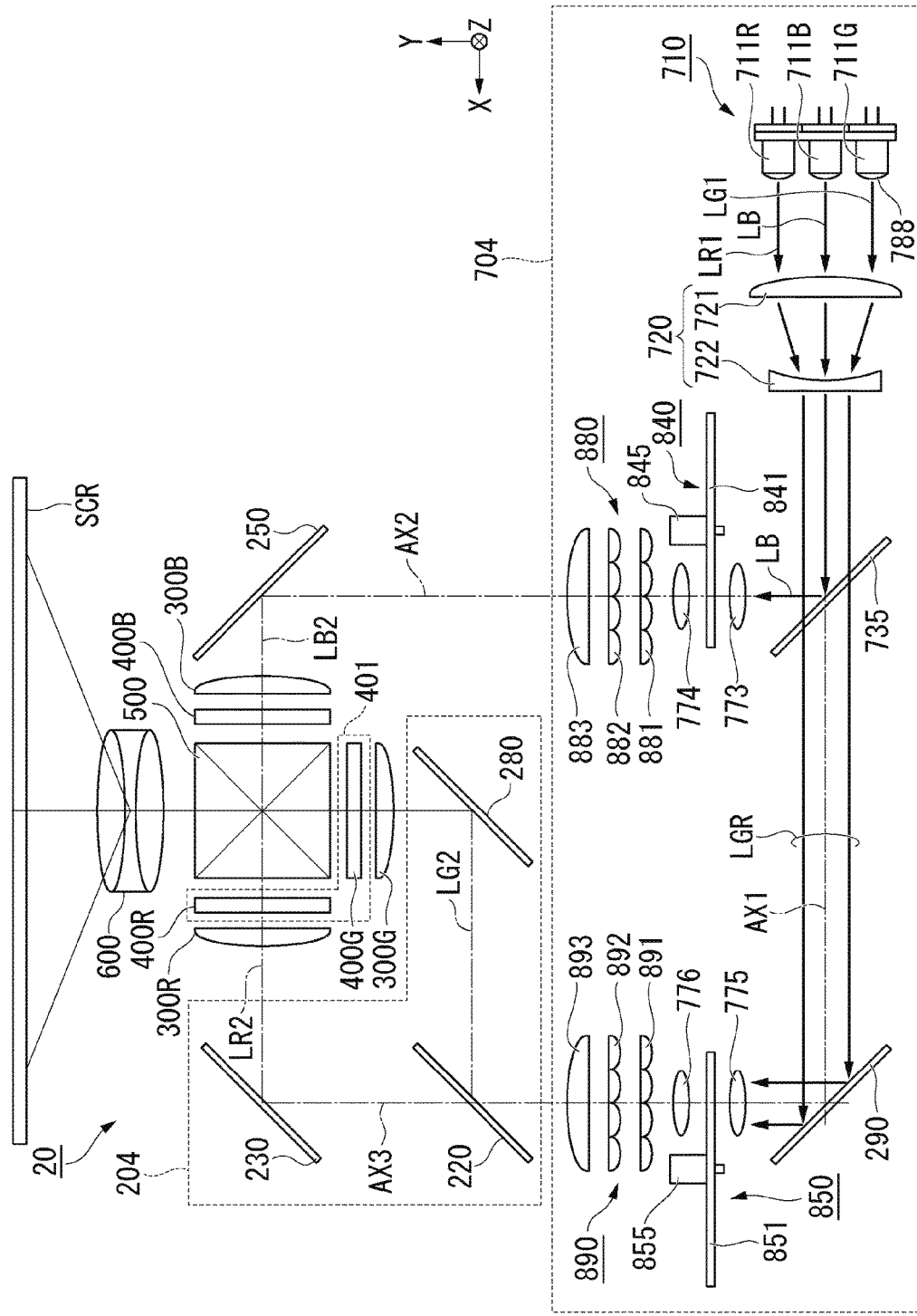
FIG. 7 is a schematic configuration diagram of a projector according to a second embodiment of the invention.

FIG. 7 is a schematic configuration diagram of the projector according to this embodiment.

In FIG. 7, components common to FIG. 1 referred to in the first embodiment are denoted by the same reference numerals and signs and explanation of the components is omitted.

As shown in FIG. 7, a projector 20 according to this embodiment includes an illumination device 704, a color separation light guide optical system 204, the reflection mirror 250, the light modulating device for red light 400R, the light modulating device for green light 400G, the light modulating device for blue light 400B, the combination optical system 500, and the projection optical device 600.

The optical axis of the blue light LB emitted from the illumination device 704 is referred to as optical axis AX2. The optical axis of the light LGR emitted from the illumination device 704 is referred to as optical axis AX3. The optical axis AX2 and the optical axis AX3 are orthogonal to the optical axis AX1.

In the illumination device 704, the light source device 710, the beam width reduction optical system 720, a dichroic mirror 735 (a light separation element), and a reflection mirror 290 are provided in this order on the optical axis AX1. The dichroic mirror 735, a first condensing lens 773, a first diffusion device 840, a first pickup lens 774, and a first integrator optical system 880 are provided in this order on the optical axis AX2. The reflection mirror 290, a second condensing lens 775, a second diffusion device 850, a second pickup lens 776, and a second integrator optical system 890 are provided in this order on the optical axis AX3.

The configuration of the light source device 710 is the same as the configuration in the first embodiment. Therefore, explanation of the configuration is omitted. The blue light LB and the light LGR are emitted from the light source device 710. The blue light LB is reflected on the dichroic mirror 735. The light LGR is transmitted through the dichroic mirror 735.

The first condensing lens 773 is provided on an optical path of the blue light LB between the dichroic mirror 735 and the first diffusion device 840. The first condensing lens 773 condenses the blue light LB emitted from the dichroic mirror 735 on a first diffusion plate 841 of the first diffusion device 840.

The first diffusion device 840 includes the first diffusion plate 841 (a first diffusion element) and a motor 845 for rotating the first diffusion plate 841. The first diffusion plate 841 has, for example, a configuration in which unevenness is formed on the surface of a member having light transmittance and has diffusion transmittance. Diffusion power of the first diffusion plate 841 is larger than diffusion power of a second diffusion plate 851 explained below. The first diffusion plate 841 transmits the incident blue light LB toward the first pickup lens 774 while diffusing the blue light LB.

The first pickup lens 774 is provided on an optical path of the blue light LB between the first diffusion device 840 and the first integrator optical system 880. The first pickup lens 774 collimates the blue light LB emitted from the first diffusion device 840 and guides the blue light LB to the first integrator optical system 880.

The first integrator optical system 880 includes a first lens array 881, a second lens array 882, and a superimposing lens 883. The first integrator optical system 880 uniformizes an illuminance distribution of the blue light LB emitted from the first diffusion device 840 in the image forming region of the light modulating device for blue light 400B.

The light LGR transmitted through the dichroic mirror 735 is reflected on the reflection mirror 290 and made incident on the second condensing lens 775.

The second condensing lens 775 is provided on the optical path of the light LGR between the reflection mirror 290 and the second diffusion device 850. The second condensing lens 775 condenses the light LGR reflected on the reflection mirror 290 on the second diffusion plate 851 of the second diffusion device 850.

The second diffusion device 850 includes a second diffusion plate 851 (a second diffusion element) and a motor 855 for rotating the second diffusion plate 851. The second diffusion plate 851 has, for example, a configuration in which unevenness is formed on the surface of a member having light transmittance and has diffusion transmittance. The second diffusion plate 851 transmits the incident light LGR toward the second pickup lens 776 while diffusing the light LGR.

The second pickup lens 776 is provided on an optical path of light between the second diffusion device 850 and the second integrator optical system 890. The second pickup lens 776 collimates the light LGR emitted from the second diffusion device 850 and guides the light LGR to the second integrator optical system 890.

The second integrator optical system 890 includes a first lens array 891, a second lens array 892, and a superimposing lens 893. The second integrator optical system 890 uniformizes an illuminance distribution of the light LGR emitted from the second diffusion device 850 in the image forming region of each of the light modulating device for green light 400G and the light modulating device for red light 400R.

The blue light LB emitted from the first integrator optical system 880 is reflected on the reflection mirror 250 and made incident on the light modulating device for blue light 400B.

The color separation light guide optical system 204 includes the dichroic mirror 220, a reflection mirror 280, and the reflection mirror 230. The dichroic mirror 220 reflects the green light LG and transmits the red light LR to separate the light LGR emitted from the second integrator optical system 890 into the red light LR and the green light LG and guides the red light LR and the green light LG respectively to the light modulating device for red light 400R and the light modulating device for green light 400G. The other components of the projector 20 are the same as the components in the first embodiment.

In this embodiment, the same effects as the effects in the first embodiment are obtained, that is, the center axis CG of the green light LG and the center axis CR of the red light LR coincide with the center axis CB of the blue light LB, divergent angles are appropriately adjusted, and color unevenness of an image is reduced.

Note that the technical scope of the invention is not limited to the embodiments. Various changes can be added without departing from the spirit of the invention.

For example, the optical device in the embodiments includes the three types of light emitting devices having the light colors different from one another. However, the light source device may include only two kinds of light emitting devices (e.g., for blue and green). In that case, it is possible to reduce color unevenness due to the two colors.

In the embodiments, the light source device including the one blue semiconductor laser, the three green semiconductor lasers, and the three red semiconductor lasers is illustrated. However, the numbers of the semiconductor lasers are not limited to this. For example, the light source device may include a plurality of blue semiconductor lasers. In that case, the plurality of green semiconductor lasers and the plurality of red semiconductor lasers only have to be rotationally symmetrically provided around the center axis of an entire light beam formed by a plurality of blue lights emitted from the plurality of blue semiconductor lasers.

In the embodiment, the diffusion plate rotatable by the motor is described as an example of the first and second diffusion elements. However, a stationary diffusion plate not including a motor may be used. The numbers, the dispositions, the shapes, the materials, the dimensions, and the like of the components of the light source device, the illumination device, and the projector illustrated in the embodiments can be changed as appropriate.

In the embodiments, the projector including the three light modulating devices is illustrated. However, the invention can also be applied to a projector that displays a color video with one light modulating device. A digital mirror device may be used as the light modulating device.

In the embodiments, the example is explained in which the light source device and the illumination device according to the invention are applied to the projector. However, the invention is not limited to this. The light source device and the illumination device according to the invention can also be applied to a lighting fixture such as a headlight for an automobile.

Third Embodiment

A third embodiment of the invention is explained below with reference to FIGS. 8 to 10.

A projector according to this embodiment is an example of a liquid crystal projector including a light source device in which a semiconductor laser is used.

Note that, in the drawings referred to below, to make it easy to see components, scales of dimensions are sometimes differentiated and shown depending on the components.

A projector 25 according to this embodiment is a projection-type image display apparatus that displays a color image on the screen (a projection surface) SCR. In the projector 25, three light modulating devices respectively corresponding to the red light LR2, the green light LG2, and the blue light LB2 are used. In the projector 25, a semiconductor laser that can obtain high-luminance and high-power light is used as a light emitting element of the light source device.

Figure 8:
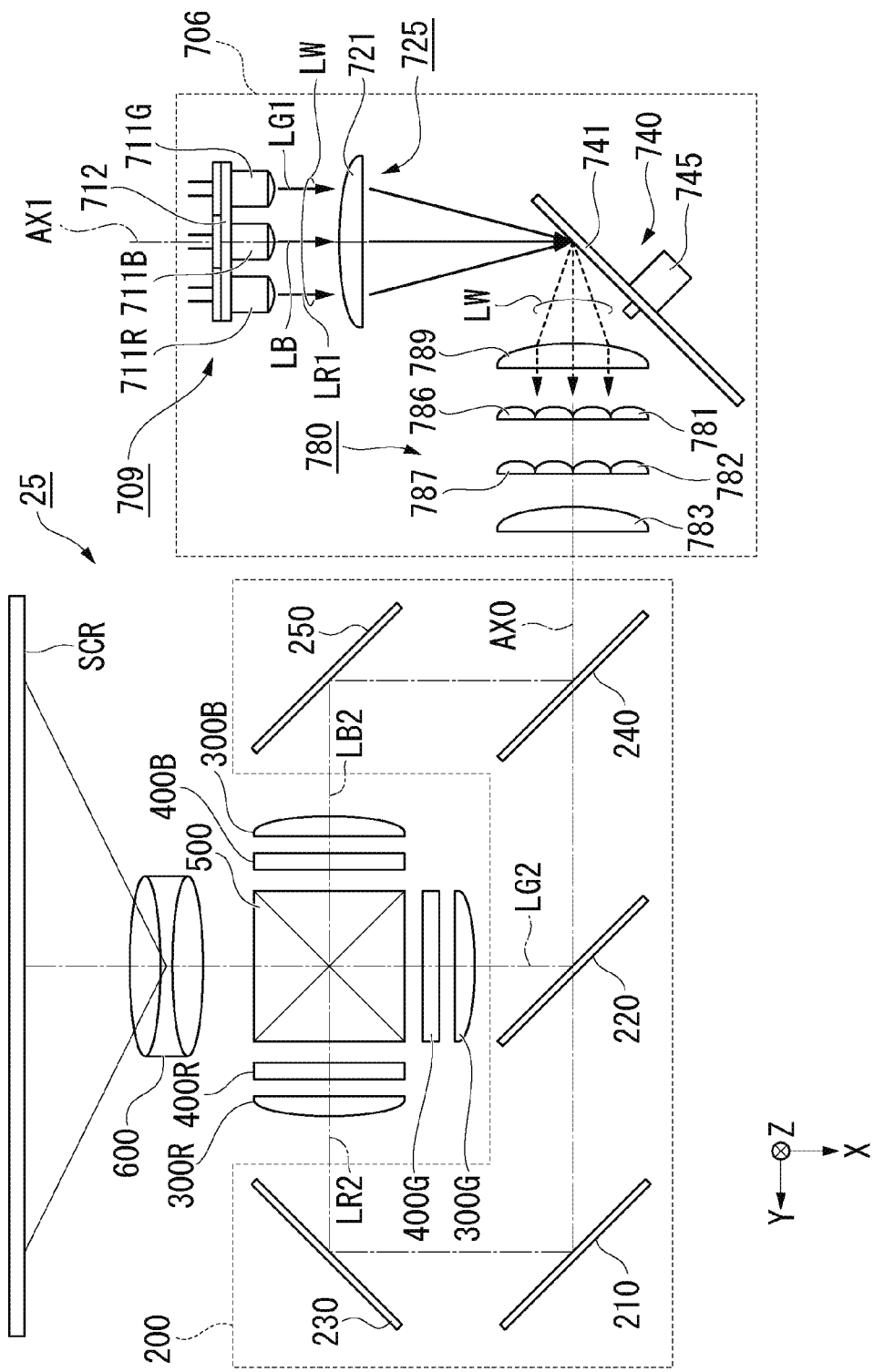
FIG. 8 is a schematic configuration diagram of a projector according to a third embodiment of the invention.

FIG. 8 is a schematic configuration diagram of the projector 25 according to this embodiment.

As shown in FIG. 8, the projector 25 includes an illumination device 706, the color separation light guide optical system 200, the light modulating device for red light 400R, the light modulating device for green light 400G, the light modulating device for blue light 400B, the combination optical system 500, and the projection optical device 600. The light modulating device for red light 400R, the light modulating device for green light 400G, and the light modulating device for blue light 400B modulate, according to image information, light emitted from the illumination device 706 to thereby form image light. The projection optical device 600 projects the image light.

The illumination device 706 includes a light source device 709, a condensing optical system 725, the diffusion device 740, a collimator lens 789, and the integrator optical system 780. In the illumination device 700, the diffusion device 740, the collimator lens 789, and the integrator optical system 780 are provided on the optical axis AX0 coinciding with the center axis of the light LW emitted from the illumination device 700. The light source device 709, the condensing optical system 725, and the diffusion device 740 are provided on the optical axis AX1 orthogonal to the optical axis AX0.

In the following explanation, a direction in which the light LW is emitted from the illumination device 706 is represented as a Y direction, a direction in which light is emitted from the light source device 709 is represented as an X direction, and a direction perpendicular to the X direction and the Y direction is represented as a Z direction. The optical axis AX1 is parallel to the X axis. The optical axis AX0 is parallel to the Y axis.

Figure 9:
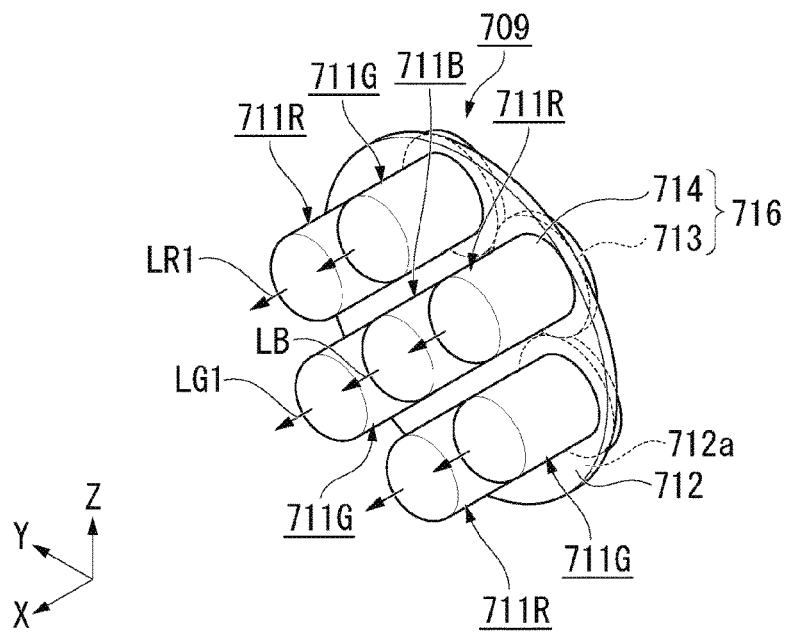
FIG. 9 is a perspective view of a light source device according to the third embodiment.

FIG. 9 is a perspective view of the light source device 709. In FIG. 9, to make it easy to see the drawing, illustration of pedestals of a part of semiconductor lasers is omitted. FIG. 10 is a front view of the light source device 709 viewed from the X-axis direction.

Figure 10:
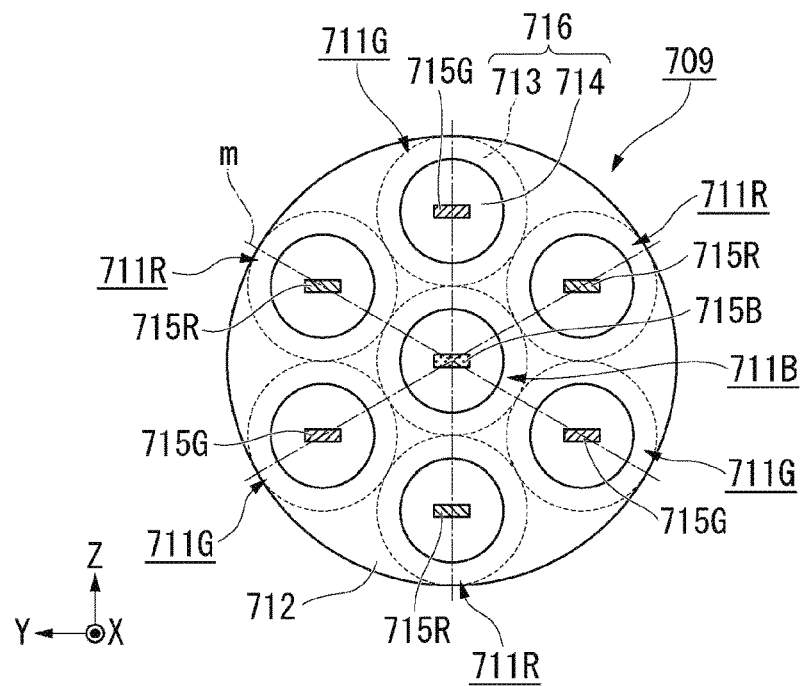
FIG. 10 is a front view of the light source device according to the third embodiment.

As shown in FIGS. 9 and 10, the light source device 709 includes the at least one blue semiconductor laser 711B (a first light emitting device), the plurality of green semiconductor lasers 711G (second light emitting devices), the plurality of red semiconductor lasers 711R (third light emitting devices), and the holding member 712.

In this embodiment, the light source device 709 includes one blue semiconductor laser 711B, three green semiconductor lasers 711G, and three red semiconductor lasers 711R. A reason why the above example is desirable as the numbers of the semiconductor lasers for the light emission colors is explained below.

However, in some case, the light source device 709 may include a plurality of blue semiconductor lasers 711B and only has to include at least one blue semiconductor laser 711B. The numbers of the green semiconductor lasers 711G and the red semiconductor lasers 711R do not always have to be three. The number of the green semiconductor lasers 711G and the number of the red semiconductor lasers 711R may be different.

The blue semiconductor laser 711B emits the blue light LB (first light of a first color) in a first direction. The green semiconductor lasers 711G emit the green beams LG1 in the first direction. The red semiconductor lasers 711R emit the red beams LR1 in the first direction. That is, the blue semiconductor laser 711B, the green semiconductor lasers 711G, and the red semiconductor lasers 711R respectively emit the color lights LB, LG1, and LR1 of the different colors in the same direction. Consequently, white light including the color lights LB, LG1, and LR1 of the three colors is emitted from the entire light source device 709.

In the following explanation, three green beams LG1 emitted from the three green semiconductor lasers 711G are collectively referred to as green light LG (second light of a second color). Three red beams LR1 emitted from the three red semiconductor lasers 711R are collectively referred to as red light LR (third light of a third color).

Each of the blue semiconductor laser 711B, the green semiconductor lasers 711G, and the red semiconductor lasers 711R is configured by a semiconductor laser of a CAN package type. In each of packages 716 (a first housing, a second housing, and a third housing) including pedestals 713 and can bodies 714 as shown in FIG. 9, as shown in FIG. 10, one or more semiconductor laser chips 715B, one or more semiconductor laser chips 715G, or one or more semiconductor laser chips 715R are housed. Note that, in this embodiment, the blue semiconductor laser 711B, the green semiconductor lasers 711G, and the red semiconductor lasers 711R respectively include the same packages 716 but may include packages different from one another.

Light emission efficiency of a semiconductor laser chip is different for each of the light emission colors. Therefore, an optical output of a semiconductor laser is also different for each of the light emission colors. That is, light emission efficiency of the blue semiconductor laser 711B is higher than light emission efficiency of the green semiconductor lasers 711G and light emission efficiency of the red semiconductor lasers 711R. Even when light emission efficiency of a semiconductor laser chip is relatively low, if electric power input to the semiconductor laser chip is increased, an optical output emitted from the semiconductor laser chip can be increased. However, the increase in the input electric power raises the temperature of the semiconductor laser chip and causes deterioration in the light emission efficiency and a decrease in life. Therefore, if the input electric power is the same, an optical output of the blue semiconductor laser 711B is higher than an optical output of the green semiconductor lasers 711G and an optical output of the red semiconductor lasers 711R.

As an example, according to Nichia Corporation, home page, product information, "Laser Diode (LD)", [online], [retrieved on Sep. 14, 2017], Internet <URL://www.nichia-.co.jp/jp/product/laser.html>, an optical output of a blue semiconductor laser (model number: NDB7K75) is, for example, 3.5 W (working temperature: 25° C.) and an optical output of a green semiconductor laser (model number: NDG7K75T) is, for example, 1 W (working temperature: 25° C.) Although not described in the home page, a blue semiconductor laser array (model number: NUBM08-02) is provided. The blue semiconductor laser array includes a plurality of blue semiconductor lasers having an optical output of 4.5 W (25° C.)

According to Mitsubishi Electric Corporation, home page, news release, "Notice of release of a 639 nm red high-power semiconductor laser for a projector" [online], [retrieved on Sep. 14, 2017], Internet <URL:http://www-.mitsubishielectric.co.jp/news/2016/1214.html>, an optical output of a red semiconductor laser (model number: ML562G85) is, for example, 2.1 W (25° C.)

When the optical output at the temperature of 25° C. is converted into an optical output at an actual working temperature of 45° C., an optical output per one semiconductor laser for each of the light emission colors (a semiconductor laser of a CAN package type) is as shown in Table 1 below.

TABLE 1

| | Color | | | |
| --- | --- | --- | --- | --- |
| | R | G | B | B |
| Model number | ML562G85 | NDG7K75T | NDB7K75 | NUBM08-02 |
| Center wavelength [nm] | 640 | 520 | 455 | 450 |
| Optical output [W/piece] | 1.26 | 0.8 | 2.8 | 4.1 |

That is, an optical output of one blue semiconductor laser (model number: NDB7K75) is 2.8 W, an optical output of one blue semiconductor laser included in a blue semiconductor laser array (model number: NUBM08-02) is 4.1 W, an optical output of one green semiconductor laser (model number: NDG7K75T) is 0.8 W, and an optical output of one red semiconductor laser (model number: ML562G85) is 1.26 W.

On the other hand, an optical output of a semiconductor laser for each of the light emission colors necessary to obtain white light (a color temperature: 6500 K) having brightness of each of 1000 lm, 2000 lm, and 3000 lm and the number of semiconductor lasers (semiconductor lasers of the CAN package type) for each of the light emission colors necessary to obtain the white light are as shown in Table 2 below.

TABLE 2

| Product brightness | Necessary optical output [W] | | | Necessary number of semiconductor lasers | | |
|---|---|---|---|---|---|---|
| [lm] | R | G | B | R | G | B |
| 3000 | 8.7 | 6.1 | 3.7 | 8 | 9 | 1 |
| 2000 | 5.83 | 4.06 | 2.46 | 6 | 6 | 1 |
| 1000 | 2.92 | 2.03 | 1.23 | 3 | 3 | 1 |

As shown in the bottom row of Table 2, optical outputs of the blue semiconductor laser, the green semiconductor laser, and the red semiconductor laser necessary to obtain white light having brightness of 1000 lm are respectively 1.23 W, 2.03 W, and 2.92 W. When calculated from the necessary optical output value [W] of Table 2 and the optical output per one semiconductor laser [W/piece] of Table 1, the numbers of the blue semiconductor lasers (model number: NDB7K75), the green semiconductor lasers (model number: NDG7K75T), and the red semiconductor lasers (model number: ML562G85) necessary to obtain white light having brightness of 1000 lm are respectively one, three, and three. These numbers coincide with the numbers of the semiconductor lasers 711B, 711G, and 711R of the light source device 709 according to this embodiment. However, in Table 2, one blue semiconductor laser included in the blue semiconductor laser array (model number: NUBM08-02) is used for brightness of 3000 lm.

Judging from the above, the light source device 709 according to this embodiment is suitable as a light source device of a projector having a light beam of approximately 1000 lm.

Note that, when one semiconductor laser includes one semiconductor laser chip, light emission efficiency of the semiconductor laser is equal to light emission efficiency of the semiconductor laser chip. When one semiconductor laser includes a plurality of semiconductor laser chips, light emission efficiency of the semiconductor laser is equal to total light emission efficiency of the plurality of semiconductor laser chips.

According to the surmise of the inventor, in future, there is possibility that, according to the progress of the semiconductor laser technology, the optical outputs of the semiconductor lasers 711B, 711G, and 711R for the respective light emission colors become larger than the numerical values described above. However, a ratio of the numbers of the semiconductor lasers 711B, 711G, and 711R for the respective colors necessary to obtain white light does not change. Therefore, although the light source device 709 including the one blue semiconductor laser 711B, the three green semiconductor lasers 711G, and the three red semiconductor lasers 711R is illustrated in this embodiment, the numbers of the semiconductor lasers are not limited to this example.

The holding member 712 is configured by a circular plate material in which seven holes corresponding to the number the plurality of semiconductor lasers 711B, 711G, and 711R and corresponding to the dimension of the can bodies 714 are provided. The material of the plate material is not particularly limited. However, for example, metal having high thermal conductivity is desirable. In a state in which the can body 714 is inserted through the hole of the holding member 712, one surface of the pedestal 713 is in contact with a first surface 712a of the holding member 712, whereby each of the plurality of semiconductor lasers 711B, 711G, and 711R is supported by the holding member 712. The first surface 712a of the holding member 712 is located on the opposite side of a light emitting direction side of the plurality of semiconductor lasers 711B, 711G, and 711R supported by the holding member 712.

As shown in FIG. 10, among the plurality of semiconductor lasers 711B, 711G, and 711R, the blue semiconductor laser 711B is disposed in the holding member 712 to be located in the center of the light source device 709. The plurality of green semiconductor lasers 711G and the plurality of red semiconductor lasers 711R are disposed in the peripheral region of the blue semiconductor laser 711B in the holding member 712 to surround the blue semiconductor laser 711B.

The green semiconductor lasers 711G and the red semiconductor lasers 711R are disposed in the holding member 712 to be located on an imaginary circle centering on the blue semiconductor laser 711B. The green semiconductor lasers 711G and the red semiconductor lasers 711R are alternately provided along the circumferential direction of the imaginary circle.

Note that the center of the imaginary circle may coincide with the center axis of light of the blue light LB of the blue semiconductor laser 711B. The center axes of lights of the red beams LR1 emitted by the individual red semiconductor lasers 711R may be present on the imaginary circle. The center axes of lights of the green beams LG1 emitted by the individual green semiconductor lasers 711G may be present on the imaginary circle.

According to the disposition explained above, in the light source device 709, angles that a plurality of straight lines m connecting the light emission centers of the blue semiconductor laser 711B, the green semiconductor lasers 711G, and the red semiconductor lasers 711R form one another are equal to one another. All the angles are 60°.

The lengths of arcs of respective fan shapes, center angles of which are respectively angles formed by three straight lines m around the center axis of light of the blue light LB of the blue semiconductor laser 711B, are equal to one another. Note that the center angles of the plurality of fan shapes are equal to one another. All the center angles are 60°.

Similar, the lengths of arcs of respective fan shapes, center angles of which are respectively angles formed by three straight lines m in the semiconductor laser chip 715B and the vicinity of the semiconductor laser chip 715B, are equal to one another. Note that the center angles of the plurality of fan shapes are equal to one another. All the center angles are 60°.

In the plurality of semiconductor lasers 711B, 711G, and 711R, the packages 716 of the semiconductor lasers adjacent to each other are in contact with each other in the portions of the pedestals 713. Note that the pedestals 713 of the plurality of semiconductor lasers 711G and 711R do not have to be in contact with one another. That is, the center axes of lights of the red beams LR1 emitted by the red semiconductor lasers 711R and the center axes of lights of the green beams LG1 emitted by the green semiconductor lasers 711G may be alternately disposed at equal intervals on an imaginary circle.

In this way, the plurality of green semiconductor lasers 711G are rotationally symmetrically provided around the center axis of the blue light LB in the peripheral region of the blue semiconductor laser 711B. The plurality of red semiconductor lasers 711R are rotationally symmetrically provided around the center axis of the blue light LB in the peripheral region of the blue semiconductor laser 711B.

To rotationally symmetrically provide the plurality of green semiconductor lasers 711G around the center axis of the blue light LB to surround the blue semiconductor laser 711B, the disposition and the positional relation explained above only have to be satisfied. Similarly, to rotationally symmetrically provide the plurality of red semiconductor lasers 711R around the center axis of the blue light LB to surround the blue semiconductor laser 711B, the disposition and the positional relation explained above only have to be satisfied.

The blue semiconductor laser 711B, the green semiconductor lasers 711G, and the red semiconductor lasers 711R are disposed such that the semiconductor laser chips 715B, 715G, and 715R (the long sides of rectangular semiconductor laser chips) face the same direction. In the example shown in FIG. 10, the blue semiconductor laser 711B, the green semiconductor lasers 711G, and the red semiconductor lasers 711R are disposed such that the long sides of the semiconductor laser chips 715G and 715R are parallel to the Y axis.

In this way, the blue semiconductor laser 711B, the green semiconductor lasers 711G, and the red semiconductor lasers 711R are disposed such that the directions of the semiconductor laser chips 715B, 715G, and 715R (the long sides of the rectangular semiconductor laser chips) are the same. However, the blue semiconductor laser 711B, the green semiconductor lasers 711G, and the red semiconductor lasers 711R emit linearly polarized lights in directions different from one another according to a difference in an oscillation mode. Specifically, the blue semiconductor laser 711B and the green semiconductor lasers 711G emit P polarized light with respect to the diffusion plate 741. The red semiconductor lasers 711R emit S polarized light with respect to the diffusion plate 741. In this case, polarization plates included in the light modulating devices 400R, 400G, and 400B only have to be disposed according to light polarizing directions. The directions of linearly polarized lights to be emitted can be set the same by rotating the directions of the semiconductor laser chips 715R of the red semiconductor lasers 711R 90° around the center axes of emitted lights (the red beams LR1) with respect to the directions of the semiconductor laser chips 715B and 715G of the other semiconductor lasers 711B and 711G.

With the configuration explained above, the light source device 709 emits the white light LW including the blue light LB, the green light LG, and the red light LR.

As shown in FIG. 8, the condensing optical system 725 condenses the light LW emitted from the light source device 709 on a predetermined condensing position, specifically, on the diffusion plate 741 of the diffusion device 740 explained below. The condensing optical system 725 is configured from one convex lens 721. Note that the condensing optical system 725 may be configured from a plurality of lenses.

The diffusion device 740 includes the diffusion plate 741 (a diffusion element) and the motor 745 (a rotating section) for rotating the diffusion plate 741. The diffusion plate 741 is irradiated with the light LW condensed by the condensing optical system 725 and diffuses the light LW. The diffusion plate 741 has, for example, a configuration in which unevenness is formed on the surface of a member having light reflectance and has diffusion reflectance. The diffusion plate 741 is disposed to form an angle of 45° with respect to each of the optical axis AX0 and the optical axis AX1. The light LW is diffused and reflected on the diffusion plate 741 to change to diffused light having a predetermined angle distribution centering on the optical axis AX0, emitted from the diffusion device 740, and travels to the integrator optical system 780.

The collimator lens 789 collimates the light LW emitted from the diffusion plate 741 and emits the light LW toward the integrator optical system 780.

The integrator optical system 780 includes the first lens array 781, the second lens array 782, and the superimposing lens 783. The integrator optical system 780 uniformizes an illuminance distribution of the light LW emitted from the collimator lens 789 in the image forming region of each of the light modulating device for red light 400R, the light modulating device for green light 400G, and the light modulating device for blue light 400B.

The first lens array 781 includes the plurality of lenses 786 for dividing the light LW emitted from the diffusion device 740 into a plurality of partial bundles of rays. The plurality of lenses 786 are arrayed in a matrix shape in a plane orthogonal to the optical axis AX0.

The second lens array 782 includes the plurality of lenses 787 corresponding to the plurality of lenses 786 of the first lens array 781. The second lens array 782 images, in conjunction with the superimposing lens 783 in a post stage, images of the lenses 786 of the first lens array 781 in the image forming region of each of the light modulating device for red light 400R, the light modulating device for green light 400G, and the light modulating device for blue light 400B or the vicinity of the image forming region. The plurality of lenses 787 are disposed in a matrix shape in a plane orthogonal to the optical axis AX0.

The superimposing lens 783 condenses the partial bundles of rays emitted from the first lens array 781 and superimposes the partial bundles of rays one on top of another in the image forming region of each of the light modulating device for red light 400R, the light modulating device for green light 400G, and the light modulating device for blue light 400B or the vicinity of the image forming region.

The color separation light guide optical system 200 includes the dichroic mirror 240, the dichroic mirror 220, the reflection mirror 210, the reflection mirror 230, and the reflection mirror 250. The color separation light guide optical system 200 separates the white light LW emitted from the illumination device 700 into the red light LR2, the green light LG2, and the blue light LB2 and guides the red light LR2, the green light LG2, and the blue light LB2 respectively to the light modulating device for red light 400R, the light modulating device for green light 400G, and the light modulating device for blue light 400B corresponding the lights.

The field lens 300R, the field lens 300G, and the field lens 300B are respectively disposed between the color separation light guide optical system 200 and the light modulating device for red light 400R, the light modulating device for green light 400G, and the light modulating device for blue light 400B.

The dichroic mirror 240 reflects the blue light LB2 and transmits the red light LR2 and the green light LG2. The dichroic mirror 220 reflects the green light LG2 and transmits the red light LR2. The reflection mirror 210 and the reflection mirror 230 reflect the red light LR2. The reflection mirror 250 reflects the blue light LB2.

Each of the light modulating device for red light 400R, the light modulating device for green light 400G, and the light modulating device for blue light 400B is configured from a liquid crystal panel that modulates incident color light according to image information and forms an image.

Note that, although not shown in FIG. 8, incident-side polarization plates are respectively disposed between the field lens 300R, the field lens 300G, and the field lens 300B and the light modulating device for red light 400R, the light modulating device for green light 400G, and the light modulating device for blue light 400B. Emission-side polarization plates are respectively disposed between the light modulating device for red light 400R, the light modulating device for green light 400G, and the light modulating device for blue light 400B and the combination optical system 500.

The combination optical system 500 combines image lights emitted from the light modulating device for red light 400R, the light modulating device for green light 400G, and the light modulating device for blue light 400B. The combination optical system 500 is configured from a cross dichroic prism formed in a substantially square shape in plan view obtained by pasting together four right-angle prisms. A dielectric multilayer film is provided on a substantially X-shaped interface obtained by pasting together the right-angle prisms.

Image light emitted from the combination optical system 500 is enlarged and projected on the screen SCR by the projection optical device 600.

In the light source device 709 according to this embodiment, the angles that the plurality of straight lines m connecting the light emission centers of the semiconductor lasers 711B, 711G, and 711R adjacent to one another form one another are equal to one another. Therefore, it is easy to keep color balance of the light source device 709. It is possible to reduce an occupied area of the light source device 709. Consequently, it is possible to implement a small light source device capable of emitting white light without using a wavelength conversion element such as a phosphor.

The semiconductor lasers 711B, 711G, and 711R adjacent to one another are disposed such that the packages 716 are in contact with one another. Therefore, it is possible to most densely dispose the semiconductor lasers 711B, 711G, and 711R. It is possible to implement a smaller light source device.

In the light source device 709 according to this embodiment, the numbers of the semiconductor lasers 711B, 711B, and 711R for the respective colors are set on the basis of the light emission efficiencies of the semiconductor lasers 711B, 711G, and 711R for the respective colors and the optical outputs of the semiconductor lasers 711B, 711G, and 711R for the respective colors necessary to obtain white light. That is, the number of each of the green semiconductor lasers 711G and the red semiconductor lasers 711R having relatively low light emission efficiency is larger than the number of the blue semiconductor lasers 711B having relatively high light emission efficiency. Therefore, the light source device 709 can easily keep color balance. In this way, it is possible to implement the light source device 709 that can easily adjust white balance of emitted light.

In this embodiment, the illumination device 706 includes the diffusion device 740 including the diffusion plate 741 that diffuses the light LW condensed by the condensing optical system 725. Therefore, the light LW, an angle distribution of which temporally changes, is emitted from the illumination device 706. Consequently, it is possible to implement the illumination device 706 with fewer speckles and less illuminance unevenness.

The projector 25 according to this embodiment includes the illumination device 706 explained above. The size of the projector 25 is small. The projector 25 can project an image with less color unevenness.

Note that the technical scope of the invention is not limited to the embodiments. Various changes can be added without departing from the spirit of the invention.

For example, in the embodiments, the light source device including the one blue semiconductor laser, the three green semiconductor lasers, and the three red semiconductor lasers is illustrated. However, the numbers of the semiconductor lasers are not limited to this. For example, the light source device may include a plurality of blue semiconductor lasers. In that case, the plurality of green semiconductor lasers and the plurality of red semiconductor lasers only have to be rotationally symmetrically provided around the center axis of an entire light beam formed by a plurality of blue lights emitted from the plurality of blue semiconductor lasers.

In the embodiments, the diffusion device including the diffusion plate rotatable by the motor is explained as the example. However, a stationary diffusion plate not including a motor may be used. The numbers, the dispositions, the shapes, the materials, the dimensions, and the like of the components of the light source device, the illumination device, and the projector illustrated in the embodiments can be changed as appropriate.

In the embodiments, the projector including the three light modulating devices is illustrated. However, the invention can also be applied to a projector that displays a color video with one light modulating device. A digital mirror device may be used as the light modulating device.

In the embodiments, the example is explained in which the light source device according to the invention is applied to the projector. However, the invention is not limited to this. The light source device according to the invention can also be applied to a lighting fixture such as a headlight for an automobile.

The entire disclosure of Japanese Patent Application No. 2017-143488, filed on Jul. 25, 2017 and Japanese Patent Application No. 2017-185673, filed on Sep. 27, 2017 are expressly incorporated by reference herein.

What is claimed is:

1. An illumination device comprising: a light source device comprising: at least one first light emitting device configured to emit a first light of a first color in a first direction; a plurality of second light emitting devices configured to emit a second light of a second color different from the first color in the first direction: and a plurality of third light emitting devices configured to emit a third light of a third color different from the first color and the second color in the first direction; wherein: a number of the plurality of second light emitting devices is larger than a number of the at least one first light emitting device, the plurality of second light emitting devices are arranged substantially rotationally symmetrically around a center axis of the first light in a peripheral region of the at least one first light emitting device, the at least one first light emitting device and at least one of the plurality of second light emitting devices are semiconductor laser chips, a number of the plurality of third light emitting devices is larger than the number of the at least one first light emitting device, the plurality of third light emitting devices are arranged substantially rotationally symmetrically around the center axis of the first light in the peripheral region of the at least one first light emitting device, the illumination device further comprising: a light separation element configured to separate the first light and the second light; a first diffusion element provided on an optical path of the first light in a post stage of the light separation element and configured to diffuse the first light, and a second diffusion element provided on an optical path of the second light in the post stage of the light separation element and configured to diffuse the second light, wherein diffusion power of the first diffusion element is larger than diffusion power of the second diffusion element.

2. The illumination device according to claim 1, wherein angles that a plurality of straight lines connecting light emission centers of the at least one first light emitting device, the plurality of second light emitting devices, and the third light emitting devices form one another are equal to one another.

3. The illumination device according to claim 1, wherein light emission efficiency of the at least one first light emitting device is higher than light emission efficiency of each of the plurality of second light emitting devices and light emission efficiency of each of the plurality of third light emitting devices.

4. The illumination device according to claim 1, wherein the first color is blue, the second color is green, and the third color is red.

5. The illumination device according to claim 4, wherein the light source device includes a singularity of the at least one first light emitting device, a trio of the plurality of second light emitting devices, and a trio of the third light emitting devices.

6. The illumination device according to claim 1, wherein: the at least one first light emitting device includes a first light emitting element and a first housing configured to house the first light emitting element on an inside, the plurality of second light emitting devices include second light emitting elements and second housings configured to house the second light emitting elements on insides, the third light emitting devices include third light emitting elements and third housings configured to house the third light emitting elements on insides, and the first housing, the second housings, and the third housings are in contact with one another.

7. The illumination device according to claim 1, wherein: the light separation element is configured to separate the first light, the second light, and the third light into the first light and fourth light including the second light and the third light; and second diffusion element is provided on an optical path of the fourth light in the post stage of the light separation element and configured to diffuse the fourth light.

8. The illumination device according to claim 1, wherein a long side of a light emission region of the at least one first light emitting device is parallel to a second direction that is orthogonal to the first direction, and a long side of a light emission region of the at least one of the plurality of second light emitting device is parallel to a third direction that is orthogonal to the first direction and the second direction.

9. An illumination device comprising: a light source device comprising: at least one first light emitting device configured to emit a first light of a first color in a first direction; a plurality of second light emitting devices configured to emit a second light of a second color different from the first color in the first direction; and a plurality of third light emitting devices configured to emit third light of a third color different from the first color and the second color in the first direction; wherein: a number of the plurality of second light emitting devices is larger than a number of the at least one first light emitting device, the plurality of second light emitting devices are arranged substantially rotationally symmetrically around a center axis of the first light in a peripheral region of the at least one first light emitting device, the at least one first light emitting device and at least one of the plurality of second light emitting devices are semiconductor laser chips, a number of the plurality of third light emitting devices is larger than the number of the at least one first light emitting device the plurality of third light emitting devices are arranged substantially rotationally symmetrically around the center axis of the first light in the peripheral region of the at least one first light emitting device, the illumination device further comprising: a light separation element configured to separate the first light, the second light, and the third light into the first light and a fourth light including the second light and the third light; a first diffusion element provided on an optical path of the first light in a post stage of the light separation element and configured to diffuse the first light; and a second diffusion element provided on an optical path of the fourth light in the post stage of the light separation element and configured to diffuse the fourth light, wherein diffusion power of the first diffusion element is larger than diffusion power of the second diffusion element.

10. The illumination device according to claim 9, wherein angles that a plurality of straight lines connecting light emission centers of the at least one first light emitting device, the plurality of second light emitting devices, and the third light emitting devices form one another are equal to one another.

11. The illumination device according to claim 9, wherein light emission efficiency of the at least one first light emitting device is higher than light emission efficiency of each of the plurality of second light emitting devices and light emission efficiency of each of the plurality of third light emitting devices.

12. The illumination device according to claim 9, wherein the first color is blue, the second color is green, and the third color is red.

13. The illumination device according to claim 12, wherein the light source device includes a singularity of the at least one first light emitting device, a trio of the plurality of second light emitting devices, and a trio of the third light emitting devices.

14. The illumination device according to claim 9, wherein: the at least one first light emitting device includes a first light emitting element and a first housing configured to house the first light emitting element on an inside, the plurality of second light emitting devices include second light emitting elements and second housings configured to house the second light emitting elements on insides, the third light emitting devices include third light emitting elements and third housings configured to house the third light emitting elements on insides, and the first housing, the second housings, and the third housings are in contact with one another.

15. The illumination device according to claim 9, wherein:
each of the first light, the second light, and the third light is linearly polarized light,
a polarization direction of the second light and a polarization direction of the third light are respectively orthogonal to a polarization direction of the first light, and
the light separation element is configured by a polarization separation element.

16. The illumination device according to claim 15, further comprising:

a first phase difference plate provided on the optical path of the first light between the light separation element and the first diffusion element; and a second phase difference plate provided on the optical path of the fourth light between the light separation element and the second diffusion element, wherein:

the first diffusion element and the second diffusion element have light reflectance, the first diffusion element is provided to reflect the first light transmitted through the first phase difference plate toward the first phase difference plate, the second diffusion element is provided to reflect the fourth light transmitted through the second phase difference plate toward the second phase difference plate, and the polarization separation element has a function of combining the first light reflected on the first diffusion element and transmitted through the first phase difference plate and the fourth light reflected on the second diffusion element and transmitted through the second phase difference plate and generating combined light.

17. A projector comprising:

the illumination device according to claim 9;

a light modulation device configured to modulate, according to image information, light emitted from the illumination device to thereby form image light; and a projection optical device configured to project the image light.

* * * * *